Jan. 19, 1932.    A. S. MULLGARDT    1,841,666
AIR FLOW GOVERNING MEANS
Filed March 19, 1930    2 Sheets-Sheet 1

INVENTOR
ALEXANDER S. MULLGARDT
BY
James D. Girnan
ATTORNEY

Jan. 19, 1932.   A. S. MULLGARDT   1,841,666
AIR FLOW GOVERNING MEANS
Filed March 19, 1930   2 Sheets-Sheet 2

INVENTOR
ALEXANDER S. MULLGARDT
BY
James D. Givnan
ATTORNEY

Patented Jan. 19, 1932

1,841,666

UNITED STATES PATENT OFFICE

ALEXANDER S. MULLGARDT, OF SEATTLE, WASHINGTON, ASSIGNOR TO BOEING AIRPLANE COMPANY, OF SEATTLE, WASHINGTON

AIR FLOW GOVERNING MEANS

Application filed March 18, 1930. Serial No. 436,976.

This invention relates to improvements in aircraft engines and more especially to a means for governing the flow of air around and over the cylinders of an engine of the radial air-cooled type.

The principal object of the invention is to regulate the flow of air past the cylinders so that the burbling or turbulency thereof is greatly reduced if not eliminated, thus causing a smooth flow of air around the body of the airplane and thereby reducing its head resistance to a minimum.

Another object of the invention is the provision of a means of this character which may be readily adapted to various sizes of engines and adjusted to various angles of incidence with respect to the airplane body.

These and other objects will appear as my invention is more fully hereinafter described in the following specification, illustrated in the accompanying drawings, and finally pointed out in the appended claims.

Figure 2:
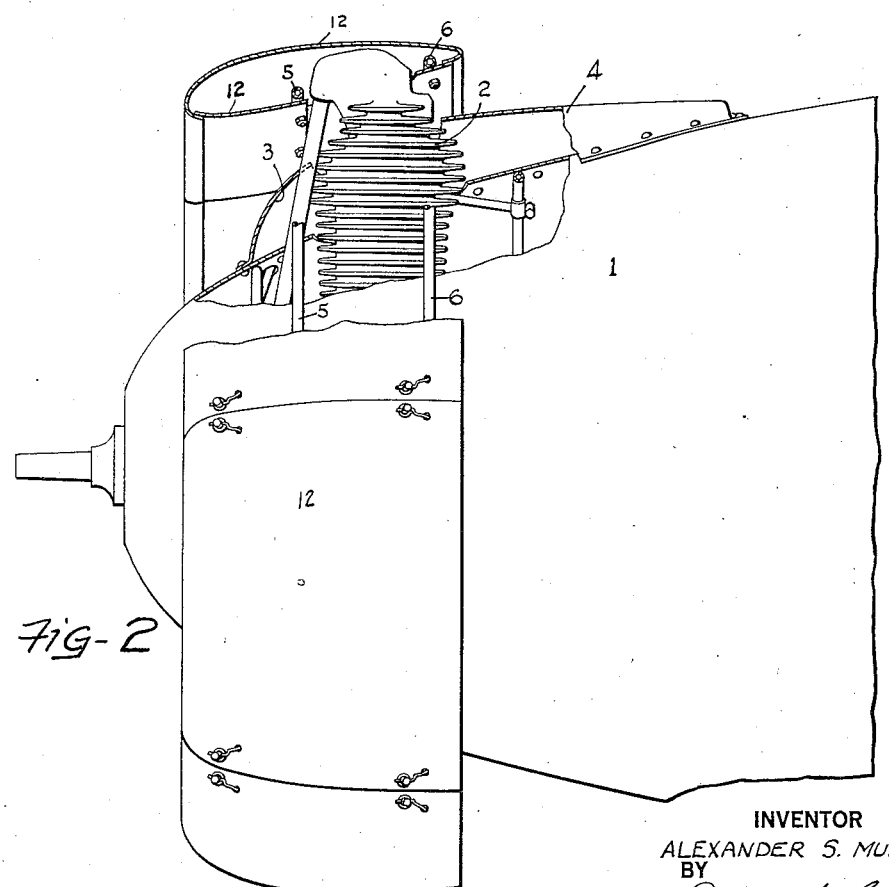
Figure 2 is a fragmentary side elevation of an airplane body with engine attached, showing the air flow governing means partly in section.

Referring now more particularly to the drawings:

Reference numeral 1 indicated the forward end of an airplane body having the radial air-cooled engine mounted in the usual manner at the forward end thereof. Each of the cylinders of the engine extends radially beyond the outer surface of the body as shown in Figure 2. A streamlining means is formed around each cylinder and is made up of two parts, indicated at 3 and 4.

A pair of supporting rings 5 and 6 embrace the engine and are supported by any suitable means, such, for instance, as the downwardly extended arms 6a, which are securely mounted to the crank case of the engine.

Figure 3:
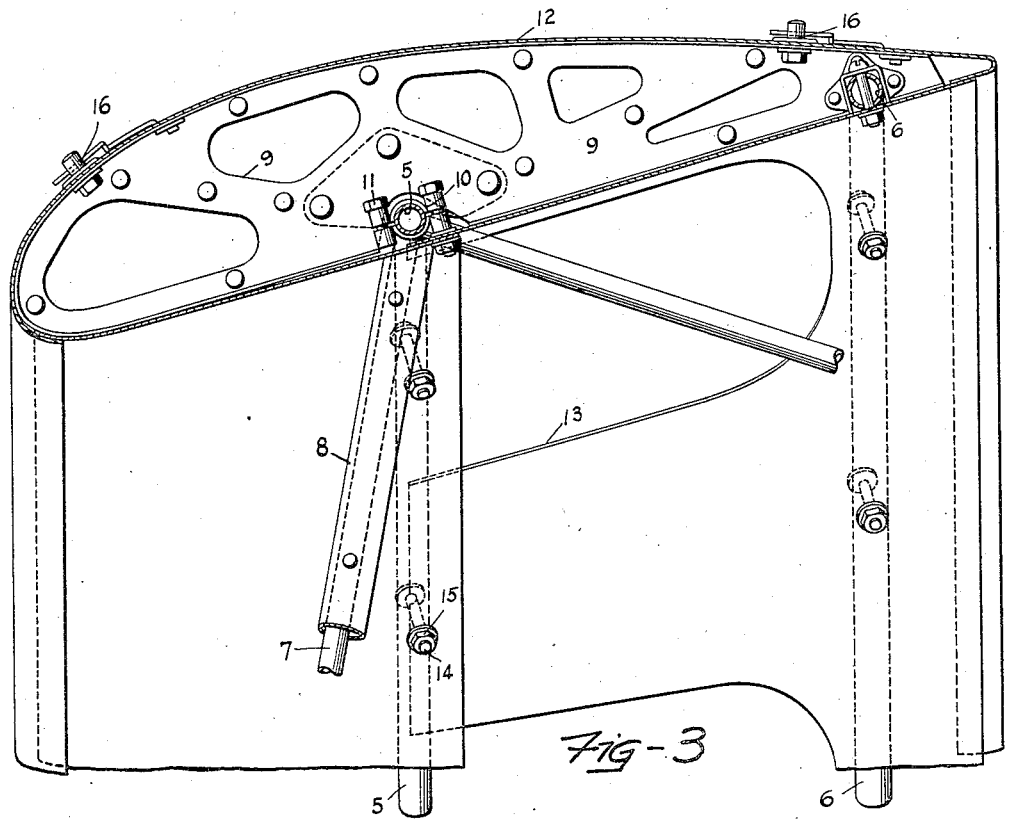
Figure 3 is an enlarged sectional detail view taken on the line 3—3 of Figure 1.
Figure 4:
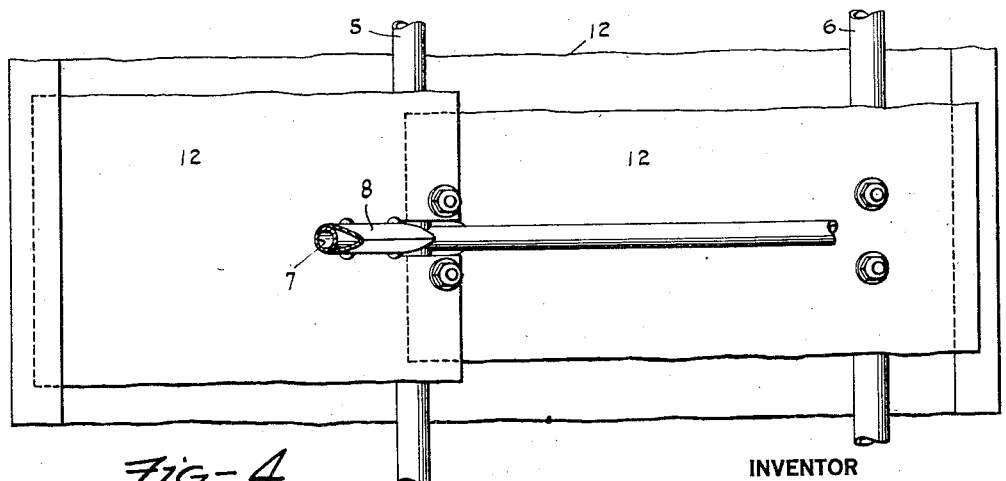
Figure 4 is a bottom plan view of Figure 3.

Each of the rods is provided with a streamlined shell 8 to reduce the air resistance of the rods to a minimum. The rings 5 and 6 support, in equally spaced relation to each other, a plurality of ribs 9. The ribs are mounted to the rings by suitable clamps, generally indicated at 10, which are made up of upper and lower portions adapted to be drawn together by means of bolts 11. The ribs, as shown in Figure 3, are of airfoil shape and are entirely embraced by a metallic covering or skin 12. The skin thus applied to and entirely surrounding the ribs, forms a complete ring of airfoil section around the engine.

The inner periphery of the ring thus formed is apertured as at 13 to accommodate the extended portions of the radially disposed cylinder heads of the engine.

At equally spaced points around the inner periphery of the ring, the skin 12 is secured to the rings 5 and 6 by any suitable means, such for instance as the bolts 14 and nuts 15. The skin 12 may be secured to the ribs in any approved manner such for instance as by riveting, bolting or the like.

Figure 1:
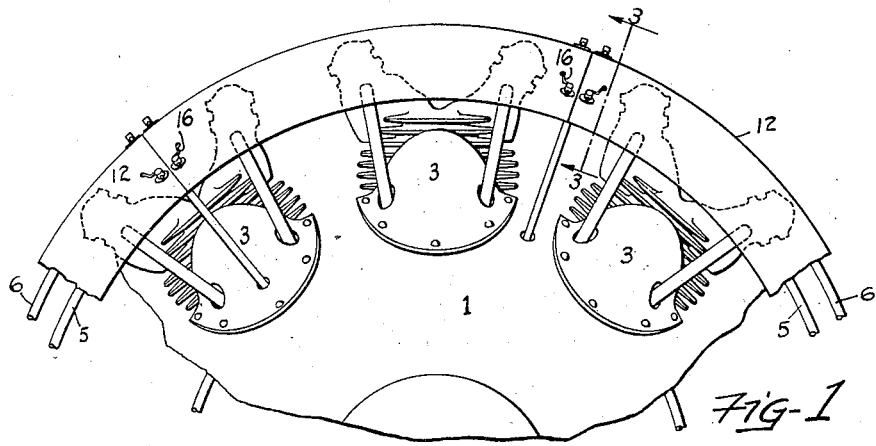
Figure 1 is a fragmentary front elevation of an airplane engine with my improved form of air flow governing means operatively installed thereon.

It will be noted in Figure 1 that the ring is made up of a number of sections and that all of the sections tightly abut each other and are held together by means of fastening devices 16, which are now common in the art.

In Figure 2 it will be noted that the ribbed ring is in an angular relation to the airplane body. This, of course, is known as the angle of incidence and may be readily varied by merely replacing the rings 5 and 6 with other rings of greater or lesser diameter.

While I have shown a particular form of embodiment of my invention, I am aware that many minor changes therein will readily suggest themselves to others skilled in the art without departing from the spirit and scope of the claims. Having thus described the invention, what I claim as new and desire to protect by Letters Patent is:

1. An aircraft and engine therefor, a means encircling said engine for directing properly the air flow about the cylinders of said engine both radially and in the direction of the length of the aircraft, said encircling means having in cross section a profile curvilinear in shape, said profile being positioned in a predetermined relation to the contour of the aircraft body, individual streamlining means arranged forward of each cylinder and adapted to partly embrace it.

2. An aircraft and engine therefor, a means encircling said engine for directing properly the air flow about the cylinders of said engine both radially and in the direction of the length of the aircraft, said encircling means having in cross section a profile curvilinear in shape, said profile being positioned in a predetermined relation to the contour of the aircraft body, individual streamlining means for each of said cylinders, said streamlining means encircling each of said cylinders and extending forwardly and rearwardly thereof.

Signed at San Francisco, California, this 5th day of August, 1931.

ALEXANDER S. MULLGARDT.